No. 619,222. Patented Feb. 7, 1899.
E. PRESCOTT.
STANCHION.
(Application filed Mar. 22, 1898.)
(No Model.)
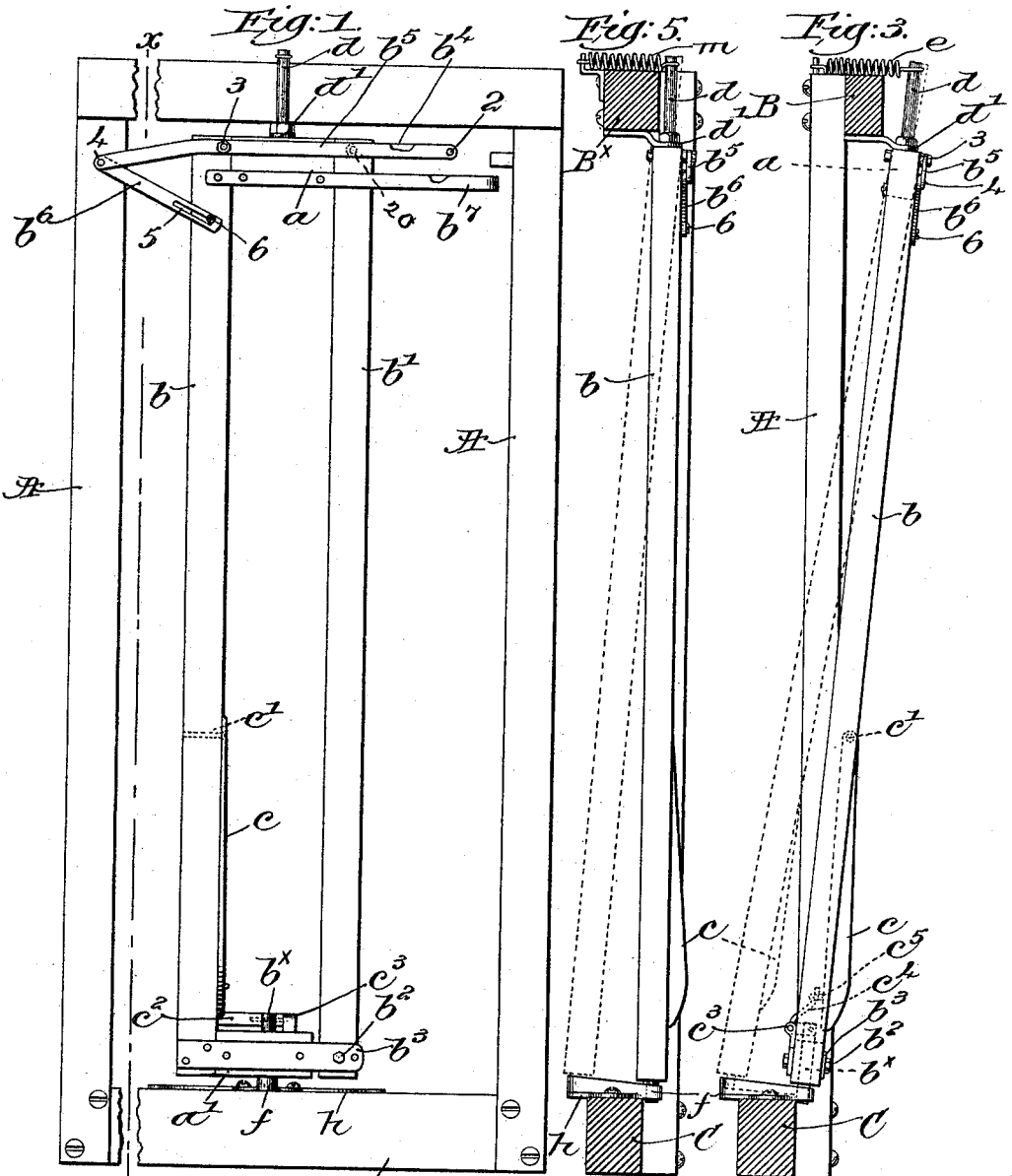
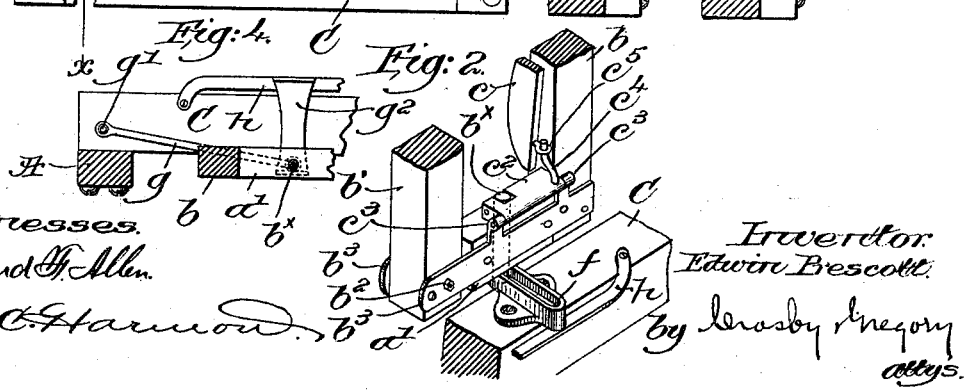
Witnesses.
Edward F. Allen.
A. C. Harmon.
Inventor.
Edwin Prescott.
by Crosby & Gregory
attys.

UNITED STATES PATENT OFFICE.

EDWIN PRESCOTT, OF ARLINGTON, MASSACHUSETTS.

STANCHION.

SPECIFICATION forming part of Letters Patent No. 619,222, dated February 7, 1899.

Application filed March 22, 1898. Serial No. 674,733. (No model.)

*To all whom it may concern:*

Be it known that I, EDWIN PRESCOTT, of Arlington, county of Middlesex, State of Massachusetts, have invented an Improvement in Stanchions, of which the following description, in connection with the accompanying drawings, is a specification, like letters and numerals on the drawings representing like parts.

This invention has for its object the production of a novel stanchion for controlling cattle in stables, &c.

In my invention I employ what is called a "swivel-stanchion," it having one bar movable toward and from the other to effect the securing of the animal in the barn.

I have provided the end of the swivel-stanchion with a pin or projection, said pin or projection having coöperating with it a controlling device which enables the end of the stanchion to be moved to and fro with relation to the platform on which the animal stands or the crib from which the animal eats, the opposite end of said stanchion being suitably supported to enable the stanchion to partake of this movement.

I have also provided the swivel-stanchion with a locking device under the control of the animal, so that as the animal starts to lie down the shoulders will act to release the locking device and permit the stanchion to move forward, the stanchion returning backward into its locked position as the animal gets fully down, and this operation is repeated in the same way as the animal arises.

The stanchion has at its upper end a pivot, which enters a hole in a suitable ear or support secured to a cross-beam, and the pivot has a nut which rests on the upper side of said ear or support.

I have also provided a stanchion which may be normally placed in an inclined position with relation to the vertical to cause the animal when standing to occupy a position well back on the platform and permitting the animal to come forward with relation to the platform when lying down.

By inclining the stanchion as described the forward movement of the stanchion effected by the animal in lying down increases the angular position of the stanchion and leaves it in such position that as soon as the animal gets fully down the gravity of the lower end of the stanchion will aid in following the shoulder of the animal, thus coming back into its normal position.

The stanchion described, having its lower end coöperating with the controlling device, may be placed in substantially a vertical position, and the said stanchion may have coöperating with it a spring, said spring being so located or connected with said stanchion as to yield to the movements of the animal when lying down or getting up.

Figure 1, in elevation, shows a stanchion embodying my invention, the same being viewed from the platform occupied by the animal. Fig. 2 is an enlarged detail of the lower end of the stanchion, it being shown in its normal backward position, the position it will occupy when the animal is either lying down or standing up on the platform. Fig. 3 is a section in the line $x$, Fig. 1, looking to the right, the stanchion being shown by dotted lines in its forward position. I mean by the "forward position" the position that the stanchion will occupy when the animal is lying down or getting up, its body then being moved forward by the act of the animal in getting upon its knees. Fig. 4 shows a modified form of controlling device for the freely-swinging end of the stanchion; and Fig. 5 shows the stanchion arranged, it may be considered, in an old barn, the stanchion in such instance occupying normally a substantially vertical position.

Referring to the drawings, let it be supposed that A represents suitable uprights in a barn, B a suitable top beam, and C a beam substantially at the level of the floor or platform on which the animal stands.

The stanchion is composed of a suitable top piece $a$, a bottom piece $a'$, a bar $b$, connecting them, and a second substantially parallel bar $b'$, one end of this latter bar being pivoted at $b^2$ between the ears of suitable strips, as $b^3$, applied to the bottom beam $a'$, said strips being preferably of metal. The upper end of the bar $b'$ has jointed to it at 20 one end of a short link $b^4$, the free end of said link having jointed to it at 2 a long lever-link $b^5$, having its fulcrum at 3, said lever-link having jointed to it at 4 one end of a link $b^6$, slotted at 5, one edge of said slot being notched to engage a suitable pin 6 in the bar $b$ to thus lock the link $b^6$ and keep the bar $b'$ in its closed position. To free the bar $b'$ and move it away from the bar $b$, it is necessary to disengage the notch of the link $b^6$ from the pin holding it and to depress the left-hand end of the lever $b^5$. The upper end of the bar $b'$ runs in a loop-like guide $b^7$, connected with the top beam $a$.

The swivel-stanchion so far described and the means for enabling the free end of the stanchion to be moved toward and from the other stanchion $b$ when locking the animal in place are and may be all substantially as shown in my Patent No. 313,524, dated March 10, 1885, with the exception that herein I have added to the said link $b^5$ the locking-link $b^6$. The addition of this locking device $b^6$ makes a positively secure lock for the movable bar of the stanchion.

The bottom beam $a'$ of the stanchion is provided in this instance of my invention with a pin or projection $b^\times$, it being shown as movable in the said beam and under the control of devices whereby the said pin may be made to lock the stanchion in its normal position, the movement of the animal in lying down or getting up operating the locking devices to move the pin and unlock the stanchion, so that one end of it may move freely without wearing the shoulders of the animal during the operation of lying down or getting up.

The bar $b$ of the stanchion is herein shown as provided with a neck-lever $c$, pivotally mounted on said bar $b$ at $c'$, the lower part of said bar being loosely connected with a locking plate or arm $c^2$, pivotally supported in suitable ears $c^3$, said plate or arm being preferably of sufficient weight, in connection with the pin $b^\times$, to normally keep said pin depressed, so that it will enter a suitable pocket or recess to retain the stanchion in its normal or backward position. This plate or arm is herein shown as operatively connected with the neck-lever by means of a pin or projection $c^4$, connected with said plate or arm, entering a loop or eye $c^5$, extended from the said neck-lever.

In Figs. 1 and 2 the pivot $d$ at the upper end of the stanchion is extended through a hole in a suitable ear or support $d'$, connected with a top beam B, and, if preferred, said pivot may have connected with it a spiral spring or equivalent $e$, the tendency of which shall be to normally move the opposite end of the stanchion into its normal position, and Fig. 3 shows the stanchion normally standing in an inclined position, and when its free end is moved forward by the animal in lying down or getting up it assumes a greater inclination, as represented by dotted lines.

The point of the shoulder of the animal when standing occupies a position about thirty inches from the platform occupied by its feet. As the animal starts to lie down it bends its knees and gets upon its knees, and in so doing its body is carried forward against the neck-lever, said lever hitting the shoulder of the animal and unlocking quickly and automatically the stanchion, so that the end of the stanchion is free to move forward into its abnormal position more or less, as represented by dotted lines. When the animal gets fully down, the shoulder is again carried backward, and the lower end of the stanchion, either by gravity or by the action of the spring, or both, as stated, follows the shoulder and the pin $b^\times$ comes into position to lock the stanchion. When the animal arises, it first gets up onto its knees, which again puts the body of the animal forward, so that the shoulder again meets the neck-lever and unlocks the lower end of the stanchion, so that it can be again moved into its abnormal position; but as soon as the animal gets fully onto its feet the shoulder is again carried back, and the stanchion is then locked again in its normal position.

As shown in Figs. 1 to 3, the pin $b^\times$ rides in a controlling device represented as a box $f$, having a guideway to be entered by the pin, a portion of one end of the box having in it a hole to be entered by the pin when the stanchion is in its normal position. The bottom of the guideway or box is represented as inclined, (see dotted lines, Fig. 3,) so that when the neck-lever has once operated to lift the bolt and the stanchion has been started forward the lower end of the bolt will ride on the said inclined bottom freely during the forward and backward movement of the stanchion. This invention is not limited, however, to the exact construction shown for the controlling device coöperating with the pin in the lower end of the stanchion, said pin forming a part of the locking device, as instead I may use a controlling device consisting, essentially, of a link $g$, pivoted at $g'$ on the sill C and connected at its opposite end loosely with the pin $b^\times$ in the bottom beam $a'$, said pin also receiving upon it a plate $g^2$, which may be extended to and connected with the lever $h$, so that the lower end of said stanchion may be free to swing back and forth across the sill C by the action of the animal in lying down or arising.

I prefer the controlling device made as a guide-box first described. I have shown a guard $h$ connected to the sill C at its front side, said guard occupying such position with relation to the lower end of the stanchion that should the same be put in its abnormal forward position when the animal is standing and the stanchion should turn around the animal could not get its leg between the lower end of the stanchion and the bar or beam C, which might possibly break or injure its leg.

The modification Fig. 5 shows the use of my improved stanchion in an old barn. In this place the beam $B^\times$ stands at the opposite side of the uprights A and is immediately above the beam C, and in such position the bar $b$ of the stanchion will stand substantially vertical instead of having an inclination, as in Fig. 3, and consequently the action of gravity to restore the stanchion to its normal position after the same has been moved into its abnormal position by the animal would not be as available. So to provide for the ready movement of the stanchion back into its normal position, as described, I employ a spring, as $m$, it being the equivalent in function and operation of the spring $e$. This spring, used as last described, may be of sufficient stiffness to normally keep the stanchion in its normal position.

Having fully described my invention, what I claim as new, and desire to secure by Letters Patent, is—

1. A stanchion normally occupying a forwardly-inclined position and provided at one end with a pin, combined with a controlling device for said pin to determine the line of swinging movement of one end of the stanchion as from its normal into its abnormal position, and back again, substantially as described.

2. A stanchion provided with a locking device consisting of a vertically-movable pin, and a controlling device coöperating with said pin to guide and direct the movements of the stanchion from its normal into its abnormal position, and vice versa, substantially as described.

3. A stanchion, provided at one end with a locking device, and a neck-lever adapted to be actuated by the shoulder of an animal to operate said locking device, substantially as described.

4. A swivel-stanchion, combined with a spring normally acting on said stanchion to keep one end thereof pressed toward the animal occupying a position on the platform, substantially as described.

5. A swivel-stanchion, combined with a spring normally acting on said stanchion to keep one end thereof pressed toward the animal occupying a position on the platform, and a locking device to lock the stanchion in its normal position, substantially as described.

6. A stanchion normally occupying a forwardly-inclined position, and provided at one end with a pin, combined with a controlling device to determine the line of swinging movement of one end of the stanchion as from its normal into its abnormal position and back again, and with a spring to normally put the stanchion in its normal position, substantially as described.

7. A stanchion occupying a forwardly-inclined position, and provided at one end with controlling means to control the direction of forward and backward movement of the stanchion, substantially as described.

In testimony whereof I have signed my name to this specification in the presence of two subscribing witnesses.

EDWIN PRESCOTT.

Witnesses:
GEO. W. GREGORY,
LAURA MANIX.